United States Patent [19]

Schindl

[11] Patent Number: 4,712,889

[45] Date of Patent: Dec. 15, 1987

[54] PHOTOMETER FOR USE WITH A MICROSCOPE

[75] Inventor: Klaus P. Schindl, Vienna, Austria

[73] Assignee: C. Reichert Optische Werke AG, Vienna, Austria

[21] Appl. No.: 799,888

[22] Filed: Nov. 20, 1985

[30] Foreign Application Priority Data

Nov. 30, 1984 [DE] Fed. Rep. of Germany ....... 3443728

[51] Int. Cl.$^4$ ..................... G02B 21/18; G02B 21/06; G01J 1/42
[52] U.S. Cl. ................................ 350/511; 350/527; 356/219
[58] Field of Search ............... 350/173, 507, 511, 527, 350/562, 565–566, 576, 211; 356/219, 225

[56] References Cited

U.S. PATENT DOCUMENTS

| 3,421,806 | 1/1969 | Weber | 350/527 |
| 3,652,163 | 3/1972 | Borkowski et al. | 350/511 |
| 3,652,167 | 3/1972 | Smith | 350/173 |
| 3,813,172 | 5/1974 | Walker et al. | 356/225 |
| 3,851,949 | 12/1974 | Kraft et al. | 356/219 |

FOREIGN PATENT DOCUMENTS 911662 5/1954 Fed. Rep. of Germany ...... 350/511

Primary Examiner—William H. Punter
Attorney, Agent, or Firm—Alan H. Spencer

[57] ABSTRACT

A photometer for use with a microscope having an object plane an image plane and an optical axis between said planes. The photometer includes an optical dividing means adapted to be disposed in the optical axis between the microscope object and image planes, and a reflective element having a reflecting surface. A pin hole occluder is adapted to be arranged on the opposite side of the optical dividing means to the reflective element. An optical imaging device provides an image of the pin hole occluder on the reflecting surface. A semi-reflective element is provided for reflecting light from the light source to the optical dividing means. A detector is arranged in an optical axis including the semi-reflective element, the pin hole occluder, the optical dividing means, the optical imaging device and reflective element. The object and image planes of the microscope and the reflecting surface of the reflective element are conjugate planes, so that further information additional to the pin hole occluder can be imaged into the microscope image plane.

8 Claims, 4 Drawing Figures

PHOTOMETER FOR USE WITH A MICROSCOPE

BACKGROUND OF THE INVENTION

This invention relates to a photometer for use with a microscope.

The Leitz MPV 3 is a microscope photometer having a divider surface which splits up a light beam between a microphotometer and a microscope eyepiece. In the imaging optical path to the microphotometer a pin hole occluder cuts a region of the field to be measured in the image of the object. The pin hole occluder is illuminated from behind so that a beam passes through the pin hole occluder through the divider surface to a mirror which images the pin hole occluder in an intermediate image in the microscope eyepiece. In this way the pin hole occluder is imaged in the intermediate image together with the direct image of the object.

In the Leitz MPV 3 microscope photometer the mirror is a triple mirror, and is arranged to reflect each light beam back on itself. The pin hole occluder is imaged in the microscope eyepiece as the brightest spot, which is superimposed on the direct image of the object in the microscope eyepiece. However one disadvantage of known microscope photometers is that they do not permit the superimposition of a further image into the microscope eyepiece additional to the image of the pin hole occluder.

SUMMARY OF THE INVENTION

It is an object of the present invention to provide a photometer for use with a microscope which overcomes the aforementioned disadvantage.

According to the present invention there is provided a photometer for use with a microscope having an object plane, an image plane and an optical axis between said planes, which photometer comprises:

an optical dividing means adapted to be disposed in said optical axis between said microscope object and image planes;

a reflective element having a reflecting surface;

a pin hole occluder adapted to be arranged on the opposite side of the optical dividing means to the reflective element;

an optical imaging device for providing an image of the pin hole occluder on the reflecting surface;

a light source;

a semi-reflective element for reflecting light from the light source to the optical dividing means;

a detector arranged in an optical axis including the semi-reflective element, pin hole occluder, optical dividing means, optical imaging device and reflective element;

the object and image planes of the microscope and the reflecting surface of the reflective element being conjugate planes.

Advantageously, the object and image planes of the microscope, the reflecting surface of the reflective element and the plane of the pin hole occluder are conjugate planes.

Since a plane conjugated to the image in the microscope eyepiece is now available on the opposite side of the optical dividing means to the pin hole occluder, a further image can be superimposed in the microscope eyepiece in addition to the imaged pin hole occluder. When using a triple mirror such a further image cannot be superimposed because no plane conjugated to the microscope image plane is available.

Typically the microscope image plane is an intermediate image plane in a microscope eyepiece.

With the arrangement according to the invention, the pin hole occluder can be imaged into the image plane of the microscope via the optical dividing means and the reflective means, both at the same enlargement and with the same orientation (i.e. upright and unreversed) as the direct image of the object. This helps to prevent adjustment errors with respect to the position of the aperture of the pin hole occluder relative to the object.

The reflective surface preferably comprises a mirror and is usually flat. However, if desired the mirror may be convex; this may be required, for example, for correction reasons.

When a further image is to be superimposed in addition to the image of the pin hole occluder, it can be imaged into the microscope eyepiece via the divider surface, together with the pin hole occluder image. In this case, the further image can also be imaged into the plane in which the mirror is located.

BRIEF DESCRIPTION OF THE DRAWINGS

Reference is now made to the accompanying drawings in which.

DESCRIPTION OF THE PREFERRED EMBODIMENTS

Figure 1:
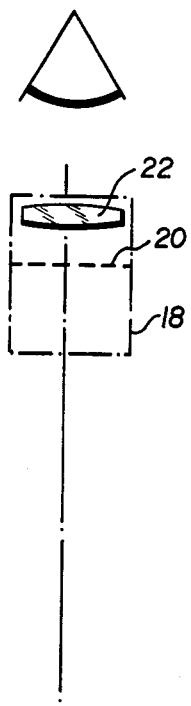
FIG. 1 shows a photometer according to the invention in a microscope.
Figure 1:
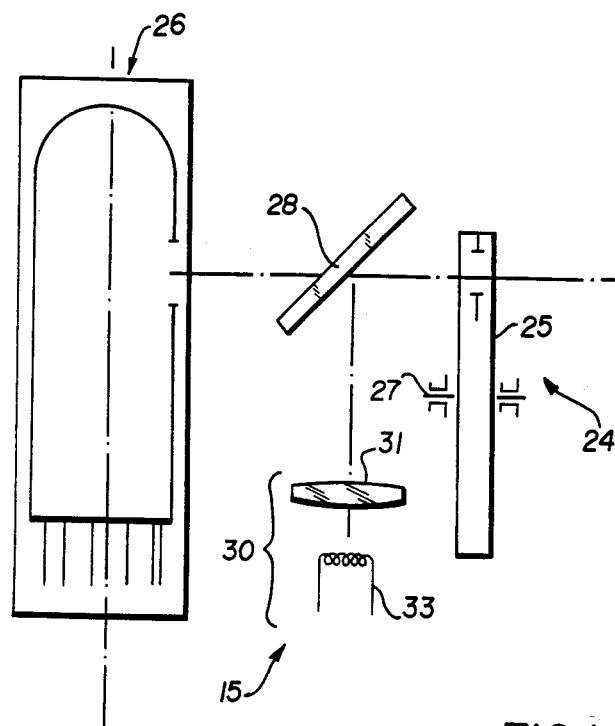
Figure 1:
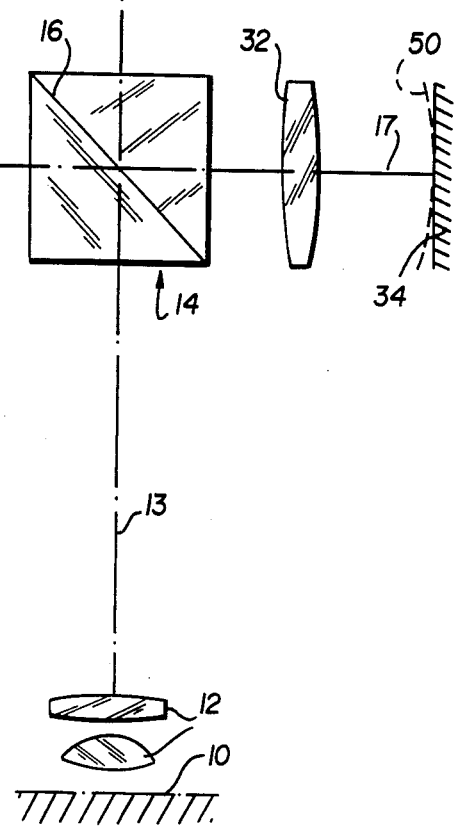

In FIG. 1 a microscope objective 12 is arranged in an optical axis 13 extending through a microscope eyepiece 18. The objective 12 is arranged above an object plane 10. The microscope eyepiece 18 includes a occular 22 which is disposed above a microscope image plane in the form of an intermediate image plane 20 in the microscope eyepiece.

A photometer generally designated 15 comprises a reflective surface in the form of a mirror 34, an imaging device comprising an auxiliary system 32, an optical dividing means in the form of a divider prism 14 having a divider surface 16, a pin hole occluder 24, a semi-reflective element in the form of a semi-reflective mirror 28, and a detector 26; all these components are arranged sequentially along an optical axis 17. The photometer 15 also includes an illuminating device 30 comprising a lens 31 and a light source 33. The optical auxiliary system 32 may comprise a lens or a lens system.

An object (not shown) on the object plane 10 is imaged directly onto the intermediate image plane 20 of the microscope eyepiece 18, the light beam passing through the divider surface 16 of the divider prism 14.

The optical axis 17 extends through the divider surface 16 and intersects the optical axis 13 at the divider surface 16. In the arrangement shown in FIG. 1, the divider surface 16 reflects part of the light from the object to the left along the optical path 17. The microscope objective 12 images the object in the plane in which the pin hole occluder 24 is disposed.

Figure 4:
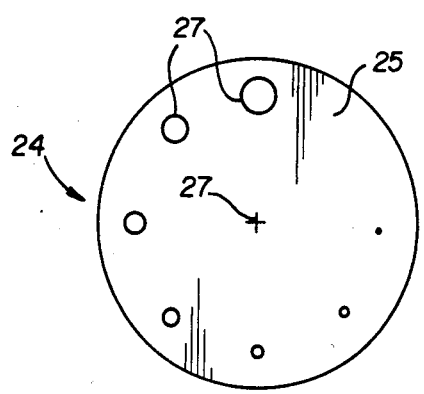
FIG. 4 is a front view of a pin hole occluder of the photometer according to the invention.

The pin occluder 24, which is illustrated schematically in FIG. 1, is shown in more detail in FIG. 4. It comprises a disc-shaped element 25 of an opaque material having a plurality of apertures 27 extending therethrough. In the embodiment shown there are seven apertures of varying diameters. The diameters may, for example, vary in the range 25 μm to 2.5 mm.

The element 25 has a central axis 27 which extends parallel to, and spaced from, the optical axis 17. The element can be rotated about the axis 27 to bring a selected one of the apertures 27 into alignment with the optical axis 17.

The pin hole occluder 24 cuts out the region of the image from the microscope objective which is aligned with the selected aperture 27.

The pin hole occluder 24 may be arranged to be movable transverse to the optical path 17 to facilitate selection of the region to be cut from the image.

The light passing through the selected aperture 27 is subsequently measured by the detector 26, which may be, for example, a microphotometer.

The pin hole occluder 24 is illuminated from behind via the semi-transparent mirror 28 with the aid of the illuminating device 30. This illumination enables the location of the pin hole occluder 24 on the intermediate image of the object to be detected in the microscope eyepiece 18. The beam from the light source 33 passes through the selected aperture 27 and through the divider surface 16, and the pin hole occluder 24 is imaged on the flat mirror 34 using the optical imaging device 32. The mirror 34 reflects back the image of the pin hole occluder 24 to the optical imaging device 32 which, after reflection on the divider surface 16, images the pin hole occluder 24 in the intermediate image plane 20 of the microscope eyepiece 18; this superimposes the image of the pin hole occluder 24 upon the direct image of the object.

The object plane 10, the plane of the pin hole occluder 24, the plane of the mirror 34 and the intermediate image plane 20 in the microscope eyepiece 18 are all conjugated to one another, so that the same enlargements and orientations of the respective images are produced. Errors in adjustment are thus prevented.

Figure 2:
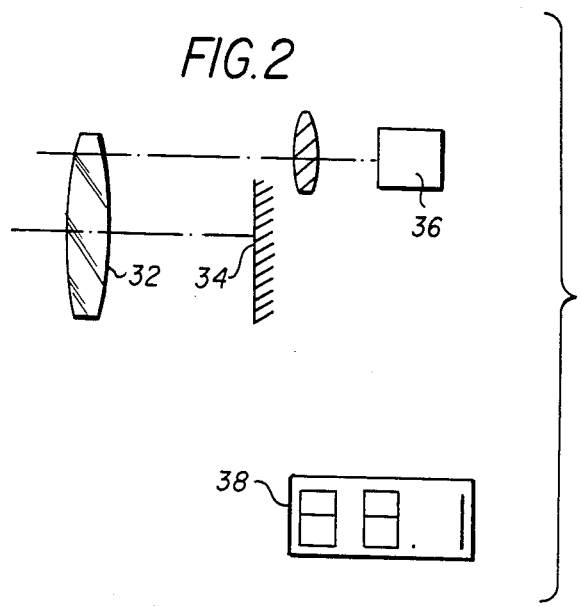
FIG. 2 shows a section through part of the photometer of FIG. 1, with superimposition of a further image.

Since on the opposite side of the divider prism 14 to the pin hole occluder 24, there is a plane conjugated to the imaging planes on all the other three sides of the divider prism 14, the divider prism 14 can also be used very easily as a reflecting surface for superimposing a further image in addition to the image of the pin hole occluder 24 upon the intermediate image plane 20. This further image can be introduced directly to the plane of the mirror 34. Alternatively, as shown in FIG. 2, the further image can be imaged on to the plane of the mirror 34 with the aid of a projection device 36. The further image may contain information which it is desired to view through the microscope eyepiece 18. For example, as shown in FIG. 2, the further image may comprise a display 38 of data corresponding to the measurement value obtained from the detector 26.

Figure 3:
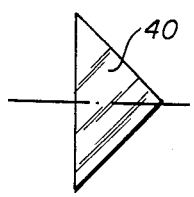
FIG. 3 illustrates a triple prism used in prior art photometers.

In prior art photometers a triple mirror 40 (see FIG. 3) is used, in place of the optical imaging device 32 and the mirror 34. Hence, on the opposite side of the divider prism 14 to the pin hole occluder 24 there exists no conjugated plane from which further information can be reflected into the microscope eyepiece.

The mirror 34 providing the reflective surface of the photometer 15 is flat. However, if desired, the photometer reflective surface may be provided by a convex mirror, such as the one indicated 50 and illustrated in phantom in FIG. 1. The convex mirror 50 may be required for corrective reasons.

I claim:

1. A photometer for use with a microscope having an object plane, an image plane and an optical axis between said planes, which photometer comprises:
    an optical dividing means adapted to be disposed in said optical axis between said microscope object and image planes;
    a reflective element having a reflecting surface;
    a pin hole occluder adapted to be arranged on the opposite side of the optical dividing means to the reflective element;
    an optical imaging device for providing an image of the pin hole occluder on the reflecting surface;
    a light source;
    a semi-reflective element for reflecting light from the light source to the optical dividing means;
    a detector arranged in an optical axis including the semi-reflective element, pin hole occluder, optical dividing means, optical imaging device and reflective element;
    the object and image planes of the microscope and the reflecting surface of the reflective element being conjugate planes.

2. A photometer according to claim 1, wherein the optical dividing means comprises a dividing prism.

3. A photometer according to claim 1, wherein the reflective element comprises a mirror.

4. A photometer according to claim 3, wherein the mirror is a flat mirror.

5. A photometer according to claim 3, wherein the mirror is a convex mirror.

6. A photometer according to claim 1, wherein the detector comprises a microphotometer.

7. A photometer according to claim 1, wherein a further image is introduced which is imaged into the microscope image plane with the image of the pin hole occluder.

8. A photometer according to claim 1, wherein the further image is imaged into a plane in which the reflective element lies.

* * * * *